United States Patent [19]

Verden et al.

[11] Patent Number: 5,407,729
[45] Date of Patent: Apr. 18, 1995

[54] LIGHT DIFFRACTING MATERIAL HAVING IMPROVED LAUNDERABILITY

[75] Inventors: Roger E. Verden, Villa Park; Thomas F. Kostka, Bartlett, both of Ill.

[73] Assignee: Prismatic, Inc., Lombard, Ill.

[21] Appl. No.: 6,268

[22] Filed: Jan. 19, 1993

Related U.S. Application Data

[63] Continuation-in-part of Ser. No. 756,191, Sep. 6, 1991, abandoned.

[51] Int. Cl.6 ............................................. B32B 3/00
[52] U.S. Cl. .................................... 428/196; 428/195; 428/200; 428/202; 428/246; 428/284; 428/285; 428/914
[58] Field of Search ............... 428/198, 195, 294, 914, 428/196, 200, 202, 246, 285

[56] References Cited

U.S. PATENT DOCUMENTS

| | | | |
|---|---|---|---|
| 4,123,309 | 10/1978 | Perrington et al. | 156/241 |
| 4,374,691 | 2/1983 | Vanden Bergh | 156/234 |
| 4,544,430 | 10/1985 | Shepherd | 156/235 |
| 4,687,527 | 8/1987 | Higashiguchi | 156/72 |
| 4,778,153 | 10/1988 | Bachman et al. | 283/101 |
| 4,810,320 | 3/1989 | Inagaki | 156/233 |
| 4,838,965 | 6/1989 | Bussard | 156/83 |
| 4,908,285 | 3/1990 | Kushibiki et al. | 430/1 |
| 4,913,504 | 4/1990 | Gallagher | 350/3.6 |
| 4,993,753 | 2/1991 | Weeks | 283/102 |
| 5,044,707 | 9/1991 | Mallik | 359/2 |
| 5,083,850 | 1/1992 | Mallik et al. | 359/1 |
| 5,128,779 | 7/1992 | Mallik | 359/2 |
| 5,145,212 | 9/1992 | Mallik | 283/86 |

FOREIGN PATENT DOCUMENTS 1-93391  4/1989  Japan.
2220386 10/1990  United Kingdom.

*Primary Examiner*—James J. Bell
*Attorney, Agent, or Firm*—Fitch, Even, Tabin & Flannery

[57] ABSTRACT

Disclosed is a method for applying light diffracting materials to a fabric in a selective pattern and which allows the fabric to withstand repeated laundering without significant deterioration of the light diffracting image. A base of adhesive resin with a layer of flexible material thereabove is adhered to the fabric in the desired selective pattern. A layer of light diffracting material is then bonded to the flexible material. The adhesive resin infiltrates the fabric and, when cured, the resin secures the fibers of the fabric in a controlled shape to prevent the fibers thereat from shifting relative to one another, thus substantially eliminating stretching and shearing forces in the layer of light diffracting material adhered thereto, which forces are commonly encountered during laundering. The resin base and flexible material layer also serve to prevent the layer of light diffracting material from sinking into the fabric during laundering, thus providing still further improvement to the launderability of the light diffracting product. In one embodiment, a light diffracting iron-on sheet is provided by which a predetermined light diffracting image may be applied to the fabric by a conventional iron. In still a further embodiment, an iron-on sheet is provided which allows for application of a light diffracting image to fabric in any desired selective pattern by applying heat and pressure to the iron-on sheet over only selective portions.

18 Claims, 4 Drawing Sheets

LIGHT DIFFRACTING MATERIAL HAVING IMPROVED LAUNDERABILITY

CROSS-REFERENCE TO RELATED APPLICATIONS

This is a continuation-in-part of U.S. Patent application Ser. No. 756,191 entitled "Flexible Material Having Light Diffracting Characteristics and Method for Production Thereof," filed on Sep. 6, 1991, now abandoned which is hereby incorporated by reference as if fully reproduced herein.

FIELD OF THE INVENTION

The present invention pertains to a method of image transferring, and more particularly, pertains to a method of applying light diffracting materials to a fabric to form a composite having improved launderability.

BACKGROUND OF THE INVENTION

Holograms and other light diffraction sheets have been known in the art for some time. They are currently employed in a wide variety of applications including display advertising, greeting cards, die-cut letters and anticounterfeiting. In such applications, holograms are mounted as unitary sheets to materials such as cardboard, plastic and metals.

Attempts have been made to incorporate this visually stimulating technology into flexible materials such as textiles and the like. However, current techniques for applying holograms to flexible materials have been found to suffer from significantly limited flexibility in the end product.

For example, current methods for attaching holograms to textiles are illustrated in U.S. Pat. Nos. 4,838,965 and 4,956,040 wherein the hologram sheets are adhered to the fabric as a continuous sheet, with a thick layer of adhesive applied across the entire hologram-fabric interface. The flexibility of the fabric at the location of the hologram is thereby significantly reduced and the image is subject to cracking upon fairly minimal flexing of the fabric. Thus, there is a need for an improved method of affixing light diffracting sheets such as holograms to flexible materials which does not significantly limit the flexibility of the end product.

Furthermore, it is the striking visual image of holograms which makes the use of such materials on textiles so desirable. Therefore, it is important that the upper surface of the hologram or diffraction grating be as freely exposed as possible, with minimal materials covering any portion thereof. Current methods for attaching such images to textiles, as illustrated in the aforementioned U.S. Pat. Nos. 4,838,965 and 4,956,040, provide for at least the entire perimeter of the upper surface of the hologram to be covered with material of significant thickness, or the entire upper surface to be covered with a material of significant thickness in the process of adhering the hologram to the textile. Accordingly, there is a need for a method of attaching holograms which leaves the upper surface of the hologram as clear as possible, to take advantage of the full visual effect associated therewith.

Moreover, there is a need for such a product which allows for laundering of the fabric to which a light diffracting image has been applied, together with the image formed thereon, which allows for subsequent launderings of the composite without significant loss of the quality of the stimulating visual effect of the applied light diffracting image. More specifically, there is a need for such a washable composite which allows for formation of a limitless variety of light diffracting designs, yet still provides significant flexibility of the washable composite without deterioration of the applied image.

The process and apparatus for carrying out the process should lend themselves to simple and economical manufacture. In this regard, it is desirable that the method and apparatus for applying the light diffracting images take advantage of existing apparatus already commonly employed in the application of images to fabrics.

SUMMARY OF THE INVENTION

In accordance with the present invention, a desired light diffracting image is adhered to a fabric, such as a T-shirt, by a method which allows the light diffracting composite to be washed repeatedly without substantially diminishing its aesthetic appearance.

It was discovered that the deterioration of the light diffracting image realized upon laundering was not caused by abrasion to the clear coating layer nor by chemical breakdown of the light diffracting material, as originally suspected. Rather, it was discovered that the deterioration of the applied light diffracting image during laundering was caused by the layer of light diffracting material sinking into the fiber mesh of the fabric, with the raising of the fabric fibers relative to the surface of the light diffracting material interrupting the image, and deteriorating its visual effect.

To provide washability, in accordance with the preferred embodiment of the invention, a thin layer of curable material such as plastisol is formed on a sheet of transfer paper in a desired pattern by a conventional screen printing press. The printed pattern so formed is a mirror image of the desired pattern for the finished product, as in conventional heat transfers. While the printed curable material pattern is in its liquid state, the printed transfer paper is then advanced to a dusting station at which the entire sheet is coated with a fine layer of heat activated adhesive. The transfer paper is vacuumed as it exits the dusting station, leaving the liquid pattern of curable material coated on its exposed side with the adhesive resin, and with some of the adhesive impregnating the curable material layer. The laminate of transfer paper, adhesive and curable material is subsequently subjected to controlled curing to partially cure the curable material, with the adhesive remaining uncured, thereby forming a foundation release sheet. The partial curing causes the curable material to gel, into a semisolid material thereby immobilizing the adhesive within the gelled polymeric material.

The foundation release sheet is then placed printed-image-side down against a fabric in a desired position, with heat and pressure then applied to activate the adhesive and bond the adhesive, together with the gelled polymeric material layer, to the fabric. The heat applied at this step is sufficient to effect final, complete curing of the gelled polymeric material to form a flexible polymeric material layer. After the fabric, adhesive and flexible polymeric layers have cooled sufficiently, the transfer paper is peeled away leaving the layer of flexible polymeric material bonded to the fabric in the desired pattern, with a thin layer of adhesive resin bonding the flexible polymeric material layer to the fabric.

A thin sheet of light diffracting material, comprising a clear coating and reflective agent laminate producing light diffracting characteristics, is pressed against the imprinted face of the fabric under heat, whereby the portions of the light diffracting material in contact with the flexible polymeric material adhere thereto. This may be realized by applying a relatively high level of heat for a sufficient period to reactivate the polymeric material, thereby making it tacky, to bond the reflective agent directly to the reactivated material; or alternatively, this may be realized by applying a thin layer of adherent to the reflective agent, which adherent is heat activated at lower temperatures than the reactivation temperature of the polymeric material, and applying heat and pressure for a sufficient period to activate the adherent, with the adherent bonding the light diffracting material to the flexible layer of polymeric material imprinted on the fabric.

The sheet of light diffracting material is then pulled away from the fabric, except over those portions in contact with the polymeric material, at which portions the clear coating and reflective layers of the light diffracting material remain on the fabric in a pattern corresponding to that of the imprinted polymeric material.

With this method, some of the adhesive becomes fluid infiltrates into the fabric upon the application of heat and pressure thereto, to form a base beneath the layer of polymeric material which is integrated into the fabric. Since the adhesive substantially infiltrates the fabric, and securely bonds to the fabric threads, the adhesive does not sink further into the fibers of the fabric upon laundering, and thus the flexible layer of polymeric material supported above the adhesive remains supported above the fibers of the fabric upon laundering, and does not sink into the fabric. Hence, the smooth upper surface of the layer of polymeric material remains above the fibers of the fabric and provides a bonding surface. Accordingly, the light diffracting material securely bonded to the smooth bonding surface of the polymeric material does not sink into the fabric during laundering, and the light diffracting image thus remains intact even during repeated launderings.

The adhesive base also significantly limits shifting of the threads of the fabric in the region immediately beneath the applied pattern relative to one another. This significantly reduces shearing stresses associated with stretching and pulling of the thin layer of light diffracting material applied above the adhesive base, further improving the washability characteristics of the finished product.

Since the method of the present invention allows for the utilization of already existing screen printing equipment, the method allows those already in the art of applying images to fabrics to supplement their already existing equipment to form light diffracting images in commercial production. Hence, completely new equipment is not required to carry out the present invention, thereby minimizing the cost of carrying out the invention.

The method and apparatus lend themselves to rapid, low cost commercial production of fabrics having light diffracting images.

BRIEF DESCRIPTION OF THE DRAWINGS

In the drawings, which are not to scale but representative only.

DETAILED DESCRIPTION OF THE PREFERRED EMBODIMENTS

Figure 4:
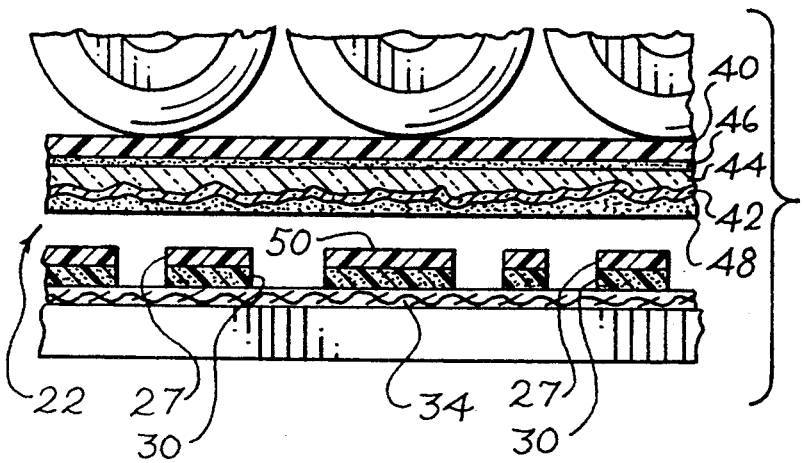
FIG. 4 is a sectional view of the heat transfer of a light diffracting application sheet to the foundation release sheet.
Figure 5:
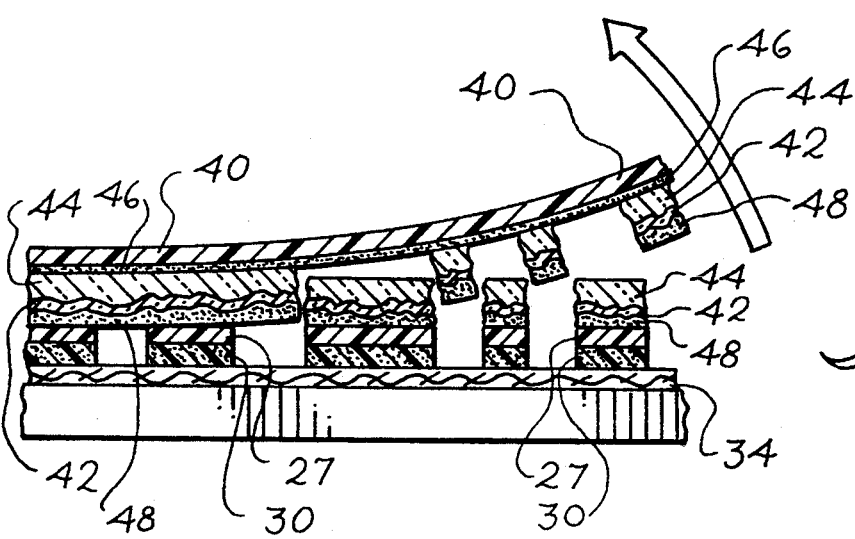
FIG. 5 is a sectional view of separation of selective portions of the application sheet from the foundation release sheet, leaving a selective light diffracting image.
Figure 6:
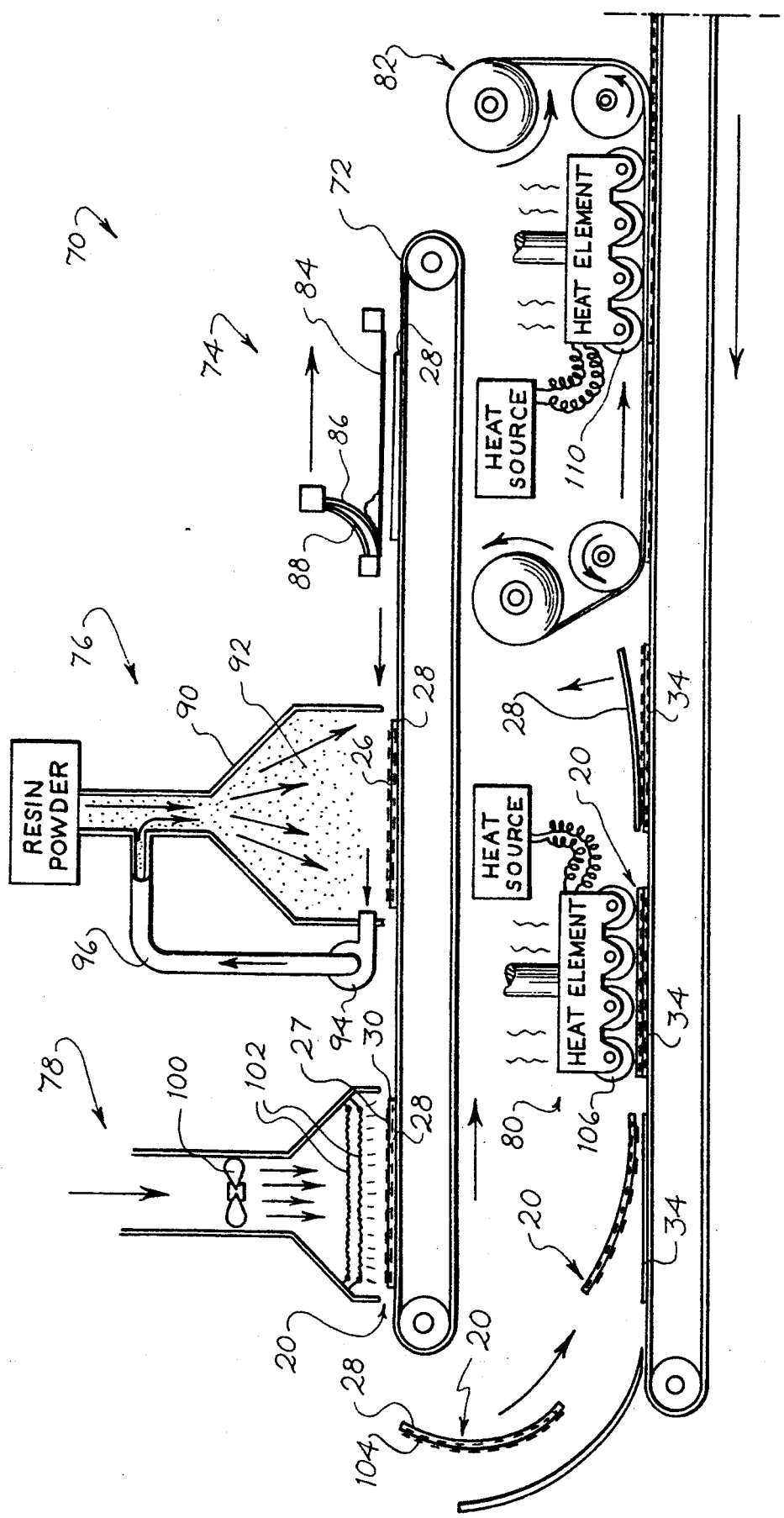
FIG. 6 is a plan view of an apparatus for forming launderable light diffracting images on a fabric embodying various features of the present invention.
Figure 7:
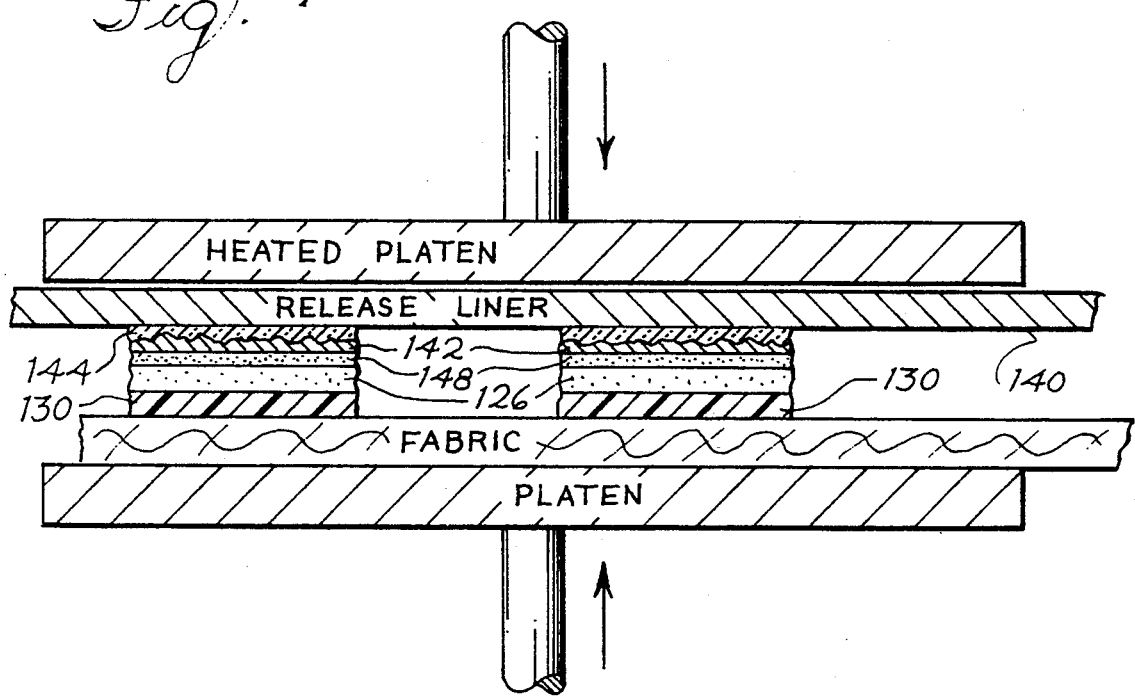
FIG. 7 is a sectional view of bonding of a light diffracting application sheet of an alternative embodiment to a fabric.
Figure 8:
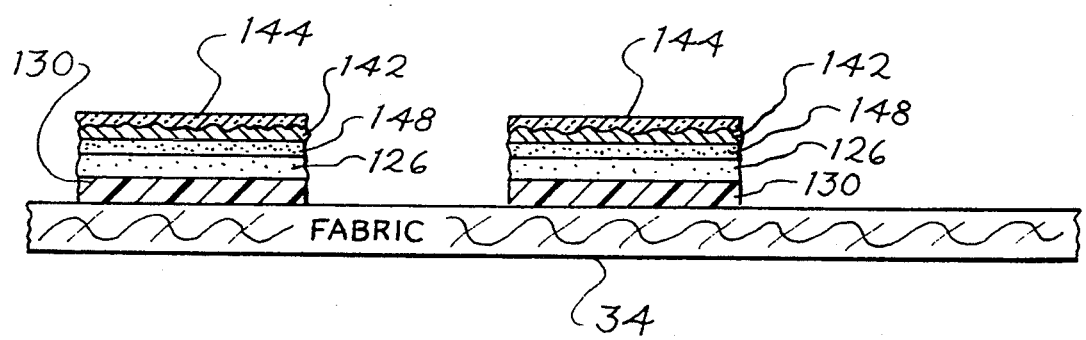
FIG. 8 is a sectional view of an alternative embodiment of a launderable material having light diffracting characteristics.
Figure 9:
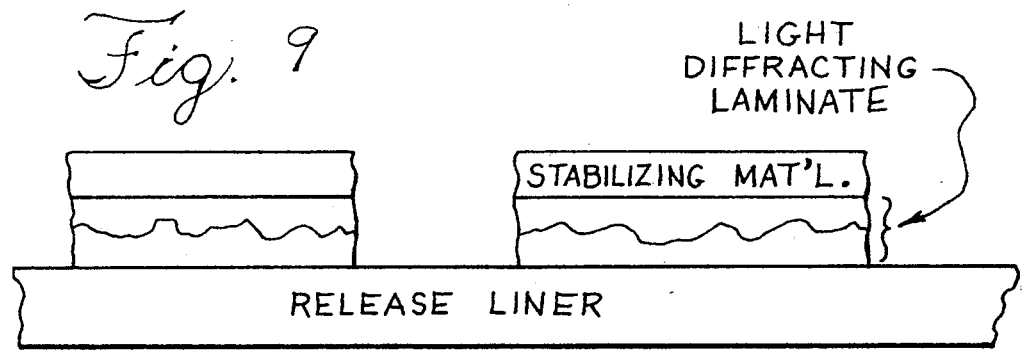
FIG. 9 is a sectional view of a light diffracting iron-on sheet embodying various features of the present invention, for applying a predetermined pattern of light diffracting images onto a fabric.

A method for carrying out the invention is illustrated graphically in FIGS. 1-5, and an apparatus for carrying out the method is illustrated in FIG. 6. The method will be described initially, with an apparatus for carrying out the method described thereafter.

Figure 1:
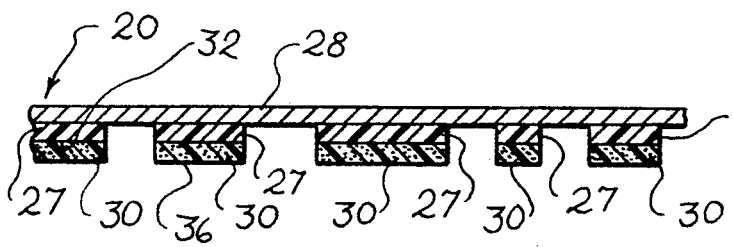
FIG. 1 is a sectional view of a foundation release sheet having a curable material layer coated with adhesive resin powder applied to a transfer sheet.

In accordance with the preferred embodiment of the method for carrying out the invention, initially a separate foundation release sheet 20 and application sheet 22 are formed. The foundation release sheet 20 is illustrated in FIG. 1 and is formed by first applying a thin layer of curable material 26, such as plastisol, onto a transfer sheet 28 in a selective pattern corresponding to the desired selective pattern for the final light diffracting image. Specifically, the selectively applied curable material layer 26 is applied to the transfer sheet 28 in a pattern which is the reverse or mirror image of the desired final image, for reasons which will become clear further below. In the preferred embodiment of the invention, the application of curable material 26 to the transfer sheet 28 is carried out by employing a conventional screen press to apply a selective pattern of plastisol, to take advantage of already existing conventional equipment and materials. The plastisol-based compound sold under the name "plastisol ink" by International Coatings has been found to provide the best results. Plastisol comprises a dispersion of finely divided resin in a plasticizer which forms a paste that gels when cured as a result of solvation of the resin particles by the plasticizer. Thus, the plastisol is in liquid form when it is applied to the transfer sheet and gels to form a flexible polymeric material when cured or partially cured, and is thus well suited for application by screen printing. However, the invention is not limited to plastisol-based materials, and may be carried out using a wide variety of curable materials including rubber based compounds, latexes, and the like, which are flexible when cured.

While the applied layer of curable material 26 is still fluid, the exposed side of the curable material layer 26 is coated and impregnated with an adhesive 30, which is preferably a heat activated adhesive resin. It is preferred that this be carried out by subjecting the applied curable material layer 26 and transfer sheet 28 to adhesive resin 30 in the form of powder, immediately after the screen printing of the curable material layer 26, and thereafter vacuuming off excess powder from the transfer sheet 28 and curable material layer 26 to leave just a thin layer of resin powder 30 remaining on the exposed surface 32 of the curable material layer 26. A portion of the applied resin powder 30 seeps into the surface 32 of the curable material layer 26, with a thin layer of resin powder 30 covering the exposed surface 32 of the selectively applied curable material layer 26. The nature of the transfer sheet 28 and curable material is such that the layer of curable material 26 adheres to the transfer sheet 28 with a weak bonding force.

Following the adhesive resin powder application, the foundation release sheet 20 is subjected to heat to at least partially cure the curable material layer 26 and set the adhesive resin therein, with the adhesive resin 30 remaining uncured. Curable material such as plastisol gels into a semisolid flexible polymeric material upon curing. Thus, at this stage of production a foundation release sheet, referred to generally by reference numeral 20, is formed with the thin layers of selectively applied flexible polymeric material 27 sandwiched between the transfer sheet 28 and a layer of resin powder 30.

The selectively applied layer of polymeric material 27 on the transfer sheet 28, together with the applied resin powder 30 are then transferred onto a desired fabric 34. This is carried out by bringing the fabric 34 adjacent the powder resin side 36 of the foundation release sheet 20 and applying heat and pressure to activate the adhesive resin and bond the adhesive resin layer 30 and polymeric material layer 27 of the foundation release sheet 20 to the fabric 34. The transfer sheet 28 is then peeled away, leaving the adhesive resin 30 and flexible polymeric material 27 remaining adhered to the fabric 34 in the pattern in which the curable material 26 was originally printed onto the transfer sheet 28. Following this transfer onto the fabric 34, the polymeric material image appearing on the fabric is, naturally, the reverse or mirror image of that originally formed on the transfer sheet 28. Thus, the initial selectively applied pattern of curable material 26 determines the peripheral contour of the final light diffracting image, which contour is the mirror image of the initially applied curable material.

The adhesive 30 is preferably a resin powder produced under the tradename VINA-MESH by Midwest Lettering, or other similar resin suitable for carrying out the present invention and having the characteristics described below. Manifestly, a wide variety of resins may be employed, and the resin may be a natural resin, synthetic resin or resinoid. Upon the aforesaid application of heat and pressure, the nature of the adhesive 30 is such that the adhesive becomes fluid, and a portion of the adhesive 30 infiltrates into the fabric 34, thereby forming a base of adhesive which is integrated with both the curable material layer 26 and the fabric 34. Since the adhesive 30 infiltrates the fabric, and securely bonds to the fabric fibers when cured, the adhesive base does not sink further into the fabric upon laundering, and the smooth upper portion of the layer of polymeric material 27 applied on top of the resin base is maintained supported above the fibers of the fabric 34 upon laundering. Hence, the light diffracting material bonded to the generally smooth upper surface of the polymeric material 27 does not sink into the fabric 34 during laundering, and the light diffracting image thus remains intact. That is, the polymeric material 27 to which the light diffracting material is bonded does not sink into the fabric to the point where the fabric 34 interferes with the light diffracting image defined by the light diffracting material.

The adhesive base integrated into the fabric bonds the fibers of the fabric together upon curing of the adhesive, thus significantly limiting shifting of the fibers of the fabric relative to one another in the region immediately beneath the applied image. This significantly reduces shearing stresses associated with pulling and stretching of the fabric which tend to fracture the thin layer of light diffracting material formed above the adhesive base or foundation. Thus, the adhesive bonding of the fabric fibers further improves the laundering characteristics of the finished light diffracting product.

Figure 3:
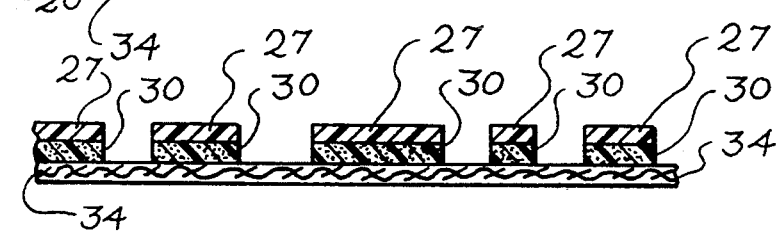
FIG. 3 is a sectional view of the foundation release sheet of FIG. 1 bonded to the fabric, with the transfer sheet removed.

At this stage of the process, the fabric 34 has one or more sections of thin layers of polymeric material 27 stably bonded thereto in patterns corresponding to the predetermined pattern desired for the light diffracting image, with each layer of polymeric material presenting a region of substantially smooth bonding surface ready to accept a light diffracting image applied thereto, as illustrated in FIG. 3. The formation of the light diffracting images and their application to the polymeric material patterns 27 formed on the fabric 34 is carried out by employment of a light diffracting application sheet 22 as mentioned above and described in detail below.

The light diffracting application sheet 22 is formed having a sheet of release liner 40, with a laminate comprising a thin layer of reflective agent 42 and thin layer of clear coating 44 adhered to the release liner 40 by the thin layer of release agent 46. A thin layer of heat activated adhesive or adherent 48 is preferably applied to the reflective agent, for reasons which will become clear below. The application sheet 22 is formed in a manner which allows the contour of the interface between the reflective agent 42 and the clear coating 44 to be accurately defined, and which allows the reflective agent 42 and clear coating 44 laminate to be easily separated from the release liner 40 when acted upon by sufficient separating force. Also, the release liner 40 should be thin enough to readily allow heat transfer therethrough.

The light diffracting application sheet 22 is formed by providing a thin sheet of release liner 40 and applying a thin layer of release agent 46 across the entire surface of the release liner 40. A layer of clear coating 44, of the type known in the art which can accept an embossing therein and retain the shape of the embossing, is applied onto the release agent 46 and thereafter embossed to a predetermined contour.

After the clear coating 44 has set sufficiently, a reflective agent 42 is applied onto the clear coating 44. The reflective agent may be silver, aluminum, or other suitable reflective material, with the reflective agent coating the grooves of the clear coating 44 which were formed by the embossing. Due to the high cost of the reflective agent 42, it may not applied so thick as to fill the grooves, but to merely line the grooves. Where production cost minimization is not of significance, the reflective agent may fill the grooves and form a smooth surface, although the layer of reflective agent should be maintained sufficiently thin to allow shearing off of interior sections thereof, as required to carry out the preferred method of the invention. Finally, the thin layer of heat activated adhesive or adherent 48 is applied across the surface of the reflective agent. Hence, an application sheet 22 is formed which allows the release liner 40 to be disengaged from the laminate of reflective agent 42 and clear coating 44 when separated by sufficient force. A light diffracting application sheet is illustrated in the upper portion of FIG. 4.

The light diffracting application sheet 22 is then brought adjacent the fabric 34, with the heat activated adherent 48 side of the application sheet 22 adjacent the polymeric material side 50 of the imprinted fabric 34. Heat and pressure are applied to the application sheet 22, or to the fabric 34, or both, to activate the heat activated adherent 48 and bond the application sheet 22 and imprinted fabric 34 together.

The nature of the heat activated adherent 48 is such that it has an affinity for bonding with the polymeric material 27 formed on the fabric 34, but does not have an affinity for bonding with the fabric 34 itself. Thus, the adherent 48 bonds the application sheet 22 securely to each of the sections of polymeric material 27, with the bonding strength of the application sheet to the fabric being small in comparison, or negligible.

After the application sheet 22 and fabric 34 have been pressed together under heat and pressure for a sufficient period of time to assure an adequate bond between the adherent 48 and the polymeric material regions 27, the release liner 40 is peeled away from the bonded application sheet 22. Since the release agent 46, which adheres the remainder of the application sheet 22 to the release liner 40, was selected having a weaker bonding strength than the adherent 48, which bonds the application sheet 22 to the polymeric material regions 27, and the adhesive 30 which bonds the polymeric material layer 27 to the fabric 34 was selected having a greater bonding strength than the adherent 48, all the layers of the application sheet 22 except the release liner 40 remain adhered to the fabric at the regions of the polymeric material 27. More specifically, as seen in FIG. 5, upon pulling the release liner 40 away from the fabric 12, the clear coating layer 44 and reflective agent layer 42 of the application sheet 22 will continue to adhere to the fabric 34 over those portions placed in contact with the applied polymeric material 27. The remaining portions of the layers of clear coating 44 and reflective agent 42, at which there is not any polymeric material, remain adhered to the release liner 40 when the release liner 40 is peeled away from the fabric 34. Hence, sections of clear coating and reflective agent laminate, which produce light diffracting images, remain bonded to the fabric 34 in the identical pattern in which the curable material 26 was applied to the fabric initially.

In U.S. patent application Ser. No. 756,191 entitled "Flexible Material Having Light Diffracting Characteristics and Method for Production Thereof," filed on Sep. 6, 1991, which is incorporated by reference as if fully reproduced herein, a method is taught for applying a selective pattern of light diffracting material directly to a fabric, rather than first applying a base or foundation to the fabric and applying the light diffracting layer onto the foundation. The application sheet utilized for this transfer comprises a laminate of release liner, weak adhesive, clear coating, and reflective layer. Strong adhesive is applied in the desired selective pattern to the reflective layer, and the application sheet is pressed against the fabric with heat and pressure to adhere it to the fabric. The release liner is then pulled away, taking with it the clear coating and reflective layers except over those portions having the applied strong adhesive which remain bonded to the fabric in the pattern of the applied strong adhesive. This method is preferable to that of the present invention in many applications, however the light diffracting product so produced has been found to be not particularly launderable, with the applied light diffracting image deteriorating upon repeated launderings.

The present invention provides for the laying of a base or foundation of adhesive and polymeric material layers, 30 and 27 respectively, onto the fabric 34, with the light diffracting material applied onto the base or foundation. The provision of the base has been found to prevent significant deterioration of the light diffracting image upon laundering, and it is believed that this improvement is realized by the adhesive penetrating into the fabric to stabilize the fibers of the fabric in the region of the applied adhesive thereby preventing the fibers from shifting relative to one another. This substantially eliminates stretching and pulling shearing forces in the fabric in the region of the applied resin, which are normally encountered during laundering and which are believed to be the major factor contributing to deterioration of an applied light diffracting layer. The layer of polymeric material 27 above the fabric-infiltrated adhesive is thus not subjected to significant shearing and tensile forces either, and provides a good smooth bonding surface, to which the light diffracting sheet is bonded so that the light diffracting sheet is also not subjected to significant shearing and tensile forces.

Another factor believed to contribute to deterioration of the light diffracting image during laundering, is the light diffracting material sinking into the fabric. The infiltration and solidifying of the adhesive into the fabric 34, together with the provision of the layer of polymeric material thereabove, sufficiently preclude sinking of the layer of light diffracting material applied onto the polymeric material layer 27 from sinking into the fabric 34. Accordingly, the adhesive and polymeric material laminate allows the applied light diffracting image to withstand repeated launderings without significant deterioration of the light diffracting image.

As mentioned briefly above, the method may be carried out without employing the heat activated adherent 48, although for reasons delineated below this is not preferred. That is, alternatively, the application sheet 22 may be bonded directly to the partially cured polymeric material layer 27 without the presence of the adherent 48. However, significantly higher temperatures are required to bond the application sheet 22 directly to the polymeric material 27 in the absence of the adherent 48. The required higher temperatures have been found to have a detrimental effect on the aesthetic appearances of the light diffracting image, and therefore it is preferred that the heat sensitive adherent 48 be employed to effect the desired transfer.

Temperatures of approximately 270° F. have been found to provide good bonding of the application sheet 22 to the polymeric material layer 27 with employment of the heat activated adherent 48, whereas temperatures in the range of approximately 350° F. to 380° F. are required to bond the application sheet 22 to the polymeric material layer 27 in the absence of the adherent 48. While the precise temperature at which deterioration of the light diffracting image will begin to occur will vary, depending upon the materials selected for the clear coating 44 and reflective agent 42, deterioration has generally been found to occur when the clear coating layer 44 and reflective agent layer 42 of the application sheet are subjected to temperatures in excess of approximately 285° F. Since the temperature required to adhere the application sheet 22 to the polymeric material 27 without adhesive is in excess of this temperature, the advantage of employing the heat sensitive adherent 48 is readily apparent.

By way of example only, the invention was practiced with successful results by forming a 0.003" layer of plastisol 26 on a transfer sheet 28 and then coating the applied plastisol layer 26 with a 0.004" layer of resin adhesive powder 30 to form the foundation release sheet 20. The imprinted transfer sheet 28 was then cured in accordance with the particular curing specifications of the plastisol, so as to partially cure the plastisol but leave the resin powder uncured. Thereafter, the imprinted side of the foundation release sheet 20 was placed against the fabric 34 and heat pressed at 350° F. for 12 seconds using 40 psi. pressure. After the fabric 34 was allowed to cool to room temperature, the transfer sheet 28 was peeled away, leaving the two-layer plastisol and adhesive resin image bonded to the fabric.

An application sheet 22 was then placed with its adhesive side down against the imprinted fabric 34 and heat pressed against the fabric 34 at 270° F. for 7 seconds using 35 psi. pressure. After the fabric 34 was again cooled to room temperature, the application sheet 22 was pulled away, leaving the light diffracting clear coating 44 and reflective agent 42 layers adhered to the fabric 34 to provide the desired light diffracting image in the pattern corresponding to the originally imprinted plastisol.

The transfer method described above is particularly well suited for T-shirt printing shops and the like which already have screen presses for applying inks or plastisol-based material to a fabric in a selective pattern. The method delineated above allows this process to be taken still further, to change a conventional single-colored plastisol image into a multi-colored light diffracting image, with the only additional equipment requirement being a heated press. Since most T-shirt printing shops also already have a heated press suitable for transferring images, in many instances no major additional equipment purchases are necessary.

The heat and pressure transfer of a polymeric pattern to the fabric, and subsequent transfer of an application sheet to the transferred polymeric image can be carried out intermittently with one shirt at a time, by employing conventional reciprocating heated platens commonly found in T-shirt printing shops to press the materials together under heat and pressure for a specified period. This allows those already having such commonly-possessed equipment to avail themselves to production of light diffracting goods without the need for additional equipment. However, such production is limited to being on a batch basis, and is not particularly well suited for large scale commercial production of goods having light diffracting characteristics.

Figure 2:
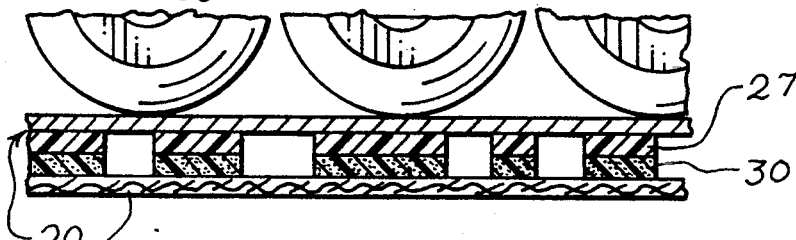
FIG. 2 is a sectional view of the heat transfer of the foundation release sheet of FIG. 1 onto a fabric.

Significantly increased production rates are attained by employing heated rollers 60, such as shown in FIGS. 2, 4 and 6, rather than reciprocating heated platens. This is discussed below with regard to the apparatus for carrying out the invention, the preferred embodiment of which is illustrated in FIG. 6.

An apparatus embodying various features the present invention is illustrated in FIG. 6, and referred to generally by reference numeral 70. In the preferred and illustrated embodiment of the apparatus, the transfer sheet 28 is carried on an advancing conveyor belt 72 and advanced to a screen printing station 74 and resin powder application station 76 to form the foundation release sheet 20 and then at least partially cured at a curing station 78, whereafter the foundation release sheet 20 is bonded to a fabric 34 carried along on the conveyor at a foundation transfer station 80 and finally brought to a light diffracting image transfer station 82 to apply the light diffracting laminate, thereby producing launderable light diffracting goods in a continuous process.

At the screen printing station 74, the layer of curable material 26 is applied to the transfer sheet 28 in a selective pattern. Screen printers are employed having a screen 84 with selective open regions defining the desired pattern, with a reciprocating flood bar 86 and squeegee 88 urging curable material through the openings to apply a layer of curable material onto the transfer sheet 28 in a selective pattern. Such apparatus are well known in the art, and therefore their operation will not be explained herein. Alternatively, the curable material may be selectively applied to the transfer sheet 28 by a roller, to allow for continuity in production to be maintained, whereas screen printing requires sequential printings and advancements.

The curable material imprinted transfer sheet 28 is then advanced to the resin powder application station 76 at which the curable material imprinted transfer sheet 28 passes through a housing 90 having adhesive in powder form 90 circulating therein. Adhesive resin powder 92 is thereby dusted across the entire imprinted surface of the transfer sheet, including the curable material. At the exit of the adhesive powder application station 76, the imprinted transfer sheet is vacuumed by a vacuum 94 to remove excess adhesive powder 92 from the surface of the curable material imprinted transfer sheet. There remains adhesive powder covering and impregnating the upper surface of the curable material following the vacuuming. To conserve adhesive powder 92, the excess adhesive powder withdrawn by the vacuum 94 is recirculated through a recirculation duct 96 back into the housing 90, rather than being discarded.

Hence, exiting the adhesive powder application station 76 is a foundation release sheet 20 comprising the transfer sheet 28 having a layer of curable material 26 imprinted thereon in a selective pattern, with the sections of curable material 26 having adhesive powder 30 on their surface and permeating at least partially into the curable material layer 26.

The foundation release sheet 20 so formed is then advanced to a curing station 78 at which a blower 100 maintains a stream of airflow across electric heating elements 102 in proximity with the conveyor 72 to effect radiative and convective heat transfer to the curable material 26 to at least partially cure the curable material to transform it into a polymeric material, with the adhesive resin layer 30 remaining uncured. This sets the adhesive powder within the polymeric material, thus assuring that the adhesive powder layer remains adhered to the polymeric material 27 in the pattern of the polymeric material.

The foundation release sheet 20 is then turned over and its curable material imprinted side 104 placed against the fabric 34. Heated rollers 106 apply heat and pressure to the foundation release sheet 20 to force the foundation release sheet 20 and fabric 34 together under sufficient heat and pressure and for a sufficient period of time that the adhesive layer 30 becomes fluid and penetrates into the fabric. The adhesive bonds the foundation release sheet 20 to the fabric 34. After the bonded foundation release sheet 20 and fabric 34 have cooled sufficiently, the transfer sheet 28 of the foundation release sheet 20 is peeled away. As discussed above, the adhesive 30 and polymeric material 27 layers remain adhered to the fabric 34, with the adhesive 30 penetrated into the fabric to provide stabilization of the fabric threads at the location of the applied image, and the adhesive also penetrated into the curable material to provide bonding of the curable material layer to the fabric on top of the adhesive base.

Next, the light diffracting application sheet 22 is then brought adjacent the fabric 34 and its adherent layer 48 brought into contact with both the fabric 34 and the polymerto material layer 27. Heated rollers 110 apply sufficient heat and pressure for a sufficient period of time to the release liner 40 to activate the heat activated adherent 48. As discussed above, the activated adherent 48 readily bonds with the polymeric material layer 27, but does not bond with the fabric 34. Thus, following cooling or setting of the product, and peeling away of the release liner 40, the reflective agent layer 42 and the clear coating layer 44 remain adhered to the curable material forming a light diffracting image on the fabric 34 in the pattern in which the curable material was originally printed on the transfer sheet.

While the above-discussed embodiment for carrying out the invention provides a method for applying a light diffracting image to a substrate in a manner whereby the applied image can withstand laundering without significant diminution of the light diffracting image, still further improved launderability characteristics are obtained with the following alternative embodiment.

In carrying out this alternative embodiment, an application sheet 122 is prepared similar to the application sheet 22 discussed above. As in the above embodiment, the application sheet 122 comprises a release liner 140 with a laminate comprising a thin layer of reflective agent 142 and thin layer of clear coating 144, such as a lacquer, adhered to the release liner 140 by a thin layer of release agent 146. A thin layer of adherent or sizing 148 covers the reflective agent 142.

However, unlike the aforementioned embodiment, the selectively applied layer of curable material is not applied directly onto the fabric. Also, unlike the aforementioned embodiment, plastisol is preferably not employed. Instead, catalyst hardening material, such as catalyst hardening ink, is preferably employed due to its advantageous hardening characteristics, which material is applied directly onto the application sheet rather than being applied directly onto the fabric. It has, unexpectedly, and advantageously, been found that a harder base between the fabric and the light diffracting layers of the application sheet increases the launderability of the applied light diffracting image.

Catalyst hardening material 126 refers to a material which hardens itself over time, with the rate of hardening of the material increasing when subjected to heat. The self-hardening characteristics of catalyst hardening materials makes them particularly well suited for carrying out large scale production since only partial curing of the material is required to sufficiently adhere the light diffracting image to the fabric in a selective pattern, with the completion of curing of the material taking place in the absence of external curing means, such as during storage or shipping of the product. The ink sold by International Coatings under the name "900 Series Screen Printing Ink" has been found to be particularly well suited for carrying out the invention; however, manifestly, the invention is not limited to this specific catalyst hardening material and a wide variety of catalyst hardening materials are well suited for carrying out the invention.

A layer of catalyst hardening material 126, which is preferably a catalyst hardening ink, is applied onto the sizing or adherent layer 148 of the application sheet in a selective pattern corresponding to the mirror image of the desired selective pattern for the final light diffracting image. The application of material 126 to the light diffracting application sheet is preferably carried out on a screen press having a screen which is permeable to said material 126 over a selective portion thereof corresponding to the desired, selective pattern of the light diffracting image.

While the applied material 126 is still wet, before it has set significantly, the exposed side of the catalyst hardening material 126 is coated and impregnated with an adhesive 130, which is preferably a heat activated adhesive resin. This is preferably carried out by subjecting the application sheet 122, particularly including the applied curable material layer 126, to adhesive resin 130 in the form of powder, immediately after screen printing of the catalyst hardening material 126, and thereafter vacuuming off excess powder from the application sheet 122 to leave just a thin layer of resin powder 130 remaining on the exposed surface of the catalyst hardening material 126. A portion of the applied resin powder 130 seeps into the surface of the catalyst hardening material 126, with a thin layer of resin powder 130 covering the exposed surface of the selectively applied catalyst hardening material 126.

Thereafter, the application sheet 120 is subjected to heat or other suitable curing means to at least partially cure the catalyst hardening material 126, and set the adhesive resin 130 therein, with the adhesive resin remaining uncured. Alternatively, the applied catalyst hardening material 126 may be exposed to ambient air for an extended period sufficient to partially cure the applied catalyst hardening material 126; however, significantly greater time is required in curing the catalyst material 126 under ambient conditions than is required in using heat to effect the desired partial curing of the catalyst hardening material. In commercial production, therefore, it is preferable to pass the application sheet 120 through a curing station immediately following application of the resin powder 130 onto the catalyst material 126.

At this point the application sheet 120 is completed and it is now ready to be applied to the fabric 34 to effect the desired light diffracting image transfer onto the fabric 34.

Hence, following the partial curing of the catalyst material 126, the application sheet 120 is placed with the catalyst hardening material 126 side of the application sheet 120 directly against the fabric 34 and the release liner 140 side of the application sheet facing upward. Since the nature of a catalyst hardening material is such that it hardens itself further over time, it is desirable not to wait for any extended period between the partial curing of the catalyst hardening material 126 and application of the transfer sheet 120 to the fabric 34.

The fabric 34, with the application sheet 120 placed against it, is supported on a substantially planar supporting surface. One side of the fabric 34 faces the supporting surface, with the release liner 140 side of the application sheet 120 facing upward on the other side of the fabric 34. A heated platen 150 is applied to the upwardly facing release liner 140 side of the application sheet 120 which imparts heat and pressure for a period sufficient to melt the adhesive resin layer 130 so as to bond the application sheet 120 to the fabric 34, as discussed above in connection with the other embodiment of the invention.

The applied heat also more fully cures the catalyst hardening material 126. While it is possible to apply sufficient heat to the catalyst hardening material 126 at this stage of production for a period sufficient to completely cure the catalyst hardening material 126, this is undesirable due the detrimental effect such increased heating would have on the light diffracting image. Hence, it is preferable to only partially cure the catalyst ink 126 at this stage of production, with final, complete curing occurring later under ambient conditions as mentioned above and discussed further below.

After the fabric 34 and application sheet 120 have been forced together under heat and pressure by the platen 150 for a period sufficient to effect bonding of the application sheet 120 to the fabric 34, the platen 150 is raised to leave the bonded-together fabric and application sheet. Manifestly, other heat and pressure applying means other than platens may be employed. For instance, it is appreciated that heated rollers could be employed to carry out the invention in a continuous process.

The bonded fabric and application sheet are allowed to cool. Thereafter, the transfer sheet 140 of the application sheet 120 is then pulled away from the fabric 34, taking with it the clear coating layer 144 and reflective layer 142, except over those portions having the applied catalyst hardening material 126 which remain bonded to the fabric 34. Accordingly, a light diffracting pattern is thereby applied to the fabric 34 in a pattern which is the mirror image of the catalyst hardening material 126 applied to the transfer sheet 120.

The catalyst hardening material 126 disposed between the fabric 34 and the reflective layer 142 remains only partially cured even after the carrier sheet 140 has been pulled away to leave the desired light diffracting pattern. It is preferred that the final curing of the catalyst hardening material 126 take place without any additional processing. The nature of different catalyst hardening materials varies considerably, with the rate of self-curing of the catalyst materials under ambient conditions varying significantly also. With employment of the aforementioned "900 Series Screen Printing Ink" by International Coatings, the partially cured catalyst ink 126 cures completely under ambient conditions in a matter of a few hours. Since there is normally a lag time greater than this curing interval between transfer of the light diffracting image onto the fabric 34 and use by the end consumer, it is generally not worth the additional cost required to cure the ink more rapidly.

However, it is appreciated that in certain instances it is also possible to employ a chemical to accelerate curing of the catalyst ink 126 after the desired, predetermined partial curing of the catalyst ink has occurred, to bring the ink rapidly to full cure. Alternatively, the fabric and light diffracting image bonded thereto may be subjected to other curing means to effect relatively rapid final curing of the catalyst ink 126. Still further, other alternative materials may be employed in place of, or in combination with, the aforementioned catalyst ink. For instance, ultraviolet cured inks or other ultraviolet cured materials, heat cured inks or other heat cured materials, and the like may be employed rather than catalyst inks without departing from the invention. Likewise, any of a wide variety of curable materials may be employed, and the invention is not limited to inks or the other specific examples recited herein. These additional processing steps allow a garment to which the light diffracting image is applied to be worn and laundered immediately following production.

Thus, following adhering of the application sheet 120 to the fabric 34, and pulling away of the application sheet from the fabric 34, the desired pattern of light diffracting image is thus formed on the fabric 34 in a manner which allows the fabric and light diffracting image to be laundered repeatedly without significant deterioration of the light diffracting image.

Hence, the fabric 34 has a laminate adhered thereto comprising a layer of adhesive resin 130 adjacent the fabric, then a layer of catalyst hardening material 126, then a layer of sizing or adherent 148, then a layer of reflective agent 142 and finally an upper layer of clear coating 144. The adhesive resin 130 penetrates into the mesh of the fabric 34 and bonds the catalyst hardening material 126 to the fabric 34. The sizing or adherent layer 148 bonds the layer of catalyst hardening material 126 to the layer of reflective agent 142. The clear coating 144 and reflective layer 142 bond directly to one another. The adhesive resin 130 penetrated into the fabric mesh and subsequently hardened prevents significant shifting of the fabric threads in the region of the applied image, with the layer of hardened catalyst material 126 providing a solid base which supports the light diffracting reflective and clear coating layers in a manner which prevents imposition of significant shearing stresses in the clear coating and reflective agent layers during laundering.

As discussed above, catalyst hardening materials 126 are particularly well suited for carrying out the present invention on a high volume basis. The material 126 may be only partially cured initially an amount sufficient to set the adhesive resin 130 therein, and partially cured still further upon being subjected to the heat and pressure associated with application of the light diffracting image to the fabric, but still remaining only partially cured and not fully cured. It is not necessary to subject the catalyst hardening material 126 to further curing means to completely cure the material 126 during production, since the nature of the catalyst hardening material is such that it will bring itself to full cure even in the absence of being subjected to curing means. Thus, while it may take two minutes or so to fully cure the applied layer of catalyst hardening material 126 by subjecting it to curing means, the layer of catalyst hardening material 126 may be subjected to curing means for only one minute or so during production, just sufficient to adhere the light diffracting application sheet to the fabric. This is sufficient to allow the fabric to be removed from further production, so that no additional production time is required to bring the catalyst hardening material 126 to its fully cured state. The remainder of the curing of the catalyst hardening material layer 126 is then effected without subjecting the material to further curing means, by the slower self-curing properties of the catalyst hardening material. While this self-curing is significantly slower than heat curing or other curing means, it is desirable since it does not require the expenditure of production time and equipment. For instance, the final self-curing of the catalyst hardening material may take place as the shirts are being shipped or stored.

In a still further alternative embodiment for applying a light diffracting image to a fabric in a manner which allows for laundering of the fabric without significantly deteriorating the light diffracting image, a light diffracting iron-on sheet may be formed suitable for applying an image to a fabric by a conventional iron. The light diffracting iron-on sheet comprises a release liner with a laminate of clear coating and reflective agent layers having light diffracting characteristics, as discussed above, bonded thereto. A layer of heat activated stabilizing material, such as a suitable adhesive, is bonded to the predetermined pattern of laminate. When the stabilizing material side of the iron-on sheet is placed against the fabric, and a hot iron is pressed against the opposite, release liner side of the iron-on sheet to force the layer of stabilizing material against the fabric under sufficient heat and pressure, the layer of stabilizing material bonds to the fabric. The laminate of clear coating and reflective agent layers, and the release liner, are also bonded to the fabric together with the stabilizing material. By providing for a lesser bonding strength between the release liner and the laminate relative to the bonding strengths between the laminate and stabilizing material and the bonding strength between the stabilizing material and the fabric, the release liner may be peeled away following the iron-heated bonding of the stabilizing material layer of the iron-on sheet to the fabric, leaving the light diffracting laminate bonded to the fabric in a predetermined pattern, as desired. The predetermined pattern so formed may be continuous or discontinuous.

Since this iron-on sheet forms a layer of stabilizing material suitable for stabilizing the threads of the fabric beneath each of the sections of applied light diffracting laminate, the fabric is launderable without significant deterioration of the light diffracting image applied thereto, as discussed above.

Figure 10:
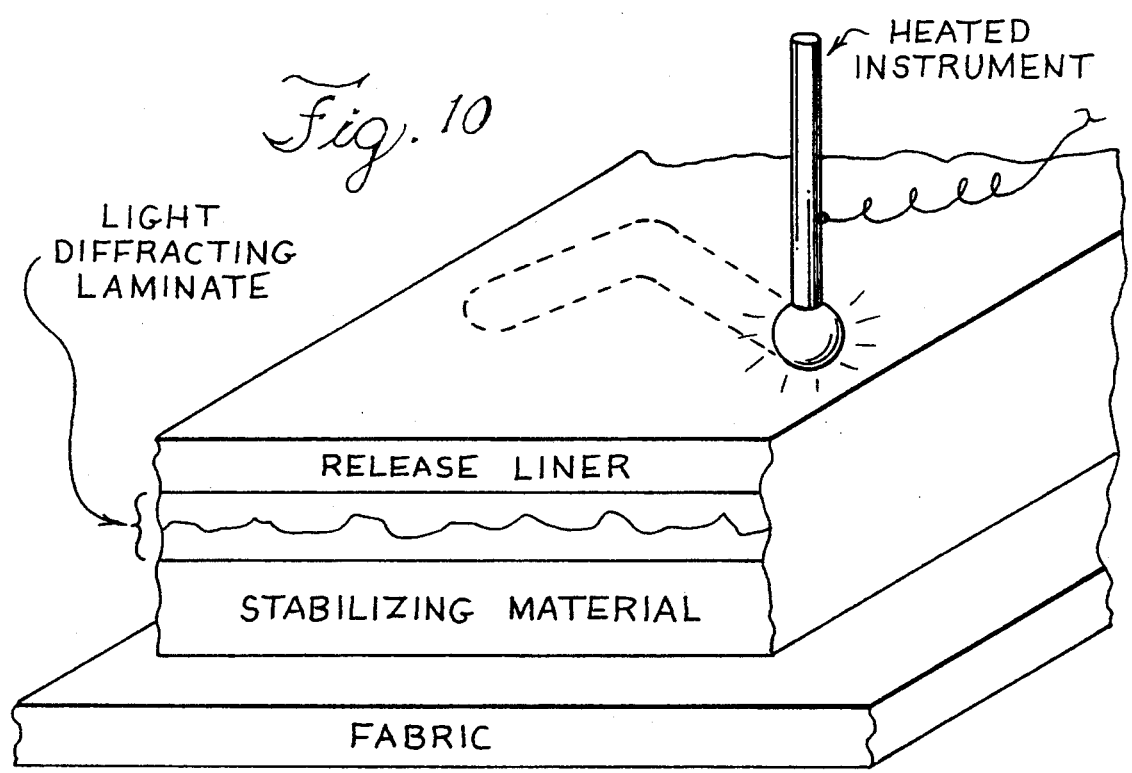
FIG. 10 is perspective view of an alternative light diffracting iron-on sheet embodying various features of the present invention, shown with a heated instrument applied thereto, for transferring a selective light diffracting pattern onto the fabric.
Figure 11:
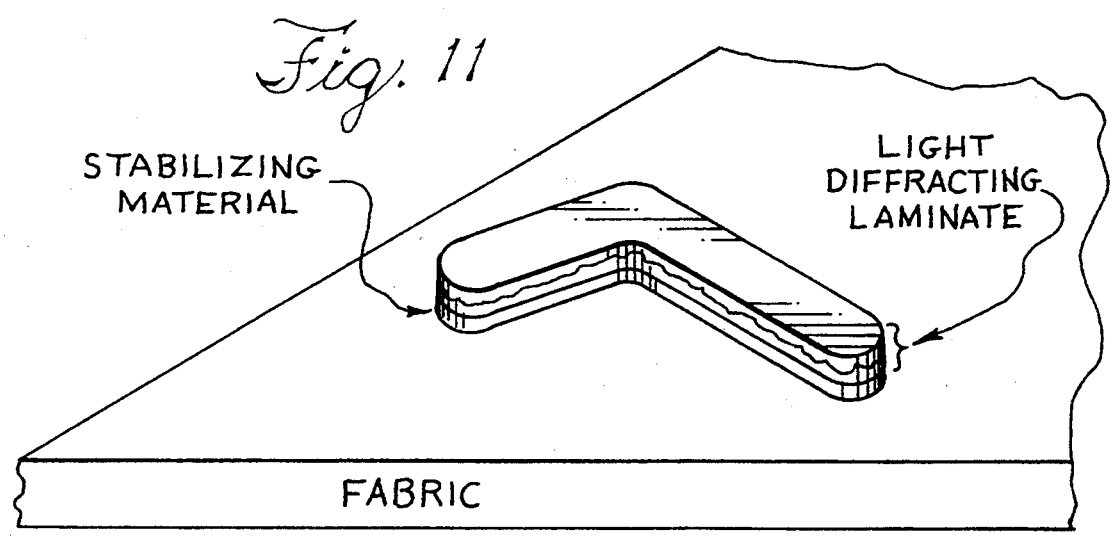
FIG. 11 is a perspective view of the fabric of FIG. 10 having the selective light diffracting image formed by the heated instrument of FIG. 10.

In still another alternative embodiment, an iron-on sheet is formed which allows application of a light diffracting image to a fabric in a selective pattern determined by the heat and pressure applied. That is, in this embodiment, only those portions of the iron-on sheet which are acted upon by the iron or other heated instrument will adhere a light diffracting image to the fabric. Hence, a heated pen or the like may be employed to sketch a desired light diffracting image onto a fabric. The iron-on sheet of this embodiment is the same as that discussed above, except that the laminate and stabilizing material layers in this embodiment are arranged in a discontinuous array across the entire transfer sheet, rather than being in a selective pattern. By placing the stabilizing material side of the iron-on sheet against the fabric, and drawing the desired image to be transferred onto the fabric, by pressing a heated instrument against the release liner side of the iron-on sheet, only those portions of the stabilizing material acted upon by the heat and pressure of the heated instrument will adhere to the fabric. Thereafter, upon pulling the release liner portion of the iron-on sheet away from the fabric, those portions of the iron-on sheet acted upon by the heat and pressure will have their stabilizing material and laminate layers remaining bonded to the fabric, and separating from the release liner as it is pulled away. Those portions of the iron-on sheet not acted upon by heat and pressure will not be bonded to the fabric, and will remain adhered to the release liner as it is pulled away, leaving a light diffracting image on the fabric in a pattern corresponding to that drawn by the heated instrument. The selective pattern so formed is thus defined by the path of the heated instrument, as illustrated in FIGS. 10 and 11. The light diffracting laminate and stabilizing material layer, are preferably in the aforementioned discontinuous array due to the fact that is has been found difficult to pull out internal portions of a continuous laminate in the manner required for carrying out this aspect of the invention.

While only specific embodiments of the invention have been described and shown, it is apparent that various alterations and modifications can be made therein. For instance, while in the preferred embodiment a screen printer is the means for applying the layer of curable material 26 to the transfer sheet 28, an infinite variety of other application means such as rollers, brushes, or the like may be employed to carry out this function. It is, therefore, the intention in the appended claims to cover all such modifications and alterations as may fall within the scope and spirit of the invention.

What is claimed is:

1. A light diffracting product formed by the method comprising the steps of:
   providing a fabric, forming a foundation release sheet, comprising the steps of:
   providing a transfer sheet;
   applying a layer of curable material, in a pattern which is the mirror image of the predetermined pattern, onto said transfer sheet;
   at least partially coating the layer of applied curable material with a heat activated adhesive, with a portion of the adhesive impregnating said layer of curable material;
   at least partially curing the adhesive-coated layer of curable material on the transfer sheet to transform the curable material into a flexible polymeric material;
   forcing the adhesive coated side of the layer of polymeric material and the fabric together under sufficient heat and pressure for a sufficient period to activate said heat activated adhesive so that at least a portion of said adhesive becomes fluidized and infiltrates the fibers of the fabric;
   providing a light diffracting application sheet, comprising a laminate of clear coating and reflective agent layers having light diffracting characteristics;
   forcing the light diffracting application sheet and the layer of polymeric material together under sufficient heat and pressure for a sufficient period to adhere the clear coating and reflective agent layers of the application sheet to the polymeric material, the heat and pressure being sufficient to at least partially cure the adhesive to stabilize the fabric fibers at the location of the adhesive so as to eliminate shifting of said fabric fibers relative to one another in the region of the applied image to prevent deterioration of the light diffracting image associated with fiber shifting; and pulling the light diffracting application sheet away from the fabric to pull the clear coating and reflective agent layers of the application sheet therewith, away from the fabric, except at the locations having said polymeric material, at which the clear coating and reflective agent layers will not be separated from the fabric, instead remaining adhered to the fabric in the pattern of the applied curable material.

2. A launderable material having light diffracting characteristics, comprising:

a fabric having threads;

a foundation, adhered to said fabric in a predetermined pattern wherein a sufficient portion of the foundation infiltrates the fabric threads to stabilize the fabric fibers thereat, with the foundation defining a substantially smooth bonding surface over said predetermined pattern of the fabric; and a light diffracting laminate defining a light diffracting image and being bonded to the smooth bonding surface of the foundation and being coterminous with the foundation, the stabilization of the fabric fibers beneath the light diffracting laminate preventing deterioration of the light diffracting image during laundering.

3. A material having light diffracting characteristics, comprising:

a fabric having a penetrable upper surface;

a layer of first adhesive bonded to said upper surface of the fabric in a predetermined pattern, with a portion of the first adhesive penetrated into said fabric, said first adhesive layer defining an upper first adhesive surface;

a layer of flexible material bonded to said upper first adhesive surface of said first adhesive layer in said selective pattern, said flexible material layer defining a substantially flat upper surface;

a layer of second adhesive bonded to said upper surface of said flexible material layer in said predetermined pattern, said second adhesive layer having an upper surface;

a layer of reflective agent bonded to said upper surface of said second adhesive layer in said predetermined pattern, said reflective agent layer having an upper surface of predetermined contour; and a layer of clear coating bonded to said upper surface of said reflective agent, said clear coating having a substantially flat upper surface.

4. A material in accordance with claim 3 wherein said flexible material comprises cured plastisol.

5. A material in accordance with claim 3 wherein said layers of first adhesive and flexible material have a combined thickness of between 0.004" and 0.009".

6. A material in accordance with claim 3 wherein said contour formed in said clear coating extends in the range of approximately 0.5 microns to 1.5 microns into the clear coating.

7. A material in accordance with claim 3 wherein said clear coating has a thickness in the range of approximately 1.0 microns to 2.5 microns.

8. A light diffracting product formed by the process comprising the steps of:

providing a fabric;

providing an application sheet, comprising a laminate of clear coating and reflective agent layers having light diffracting characteristics;

applying a layer of curable material, in a pattern which is the mirror image of the predetermined pattern, onto the reflective agent side of the application sheet;

at least partially coating the layer of applied curable material with a heat activated adhesive, with a portion of the adhesive impregnating said layer of curable material;

at least partially curing the adhesive-coated layer of curable material to set the heat activated adhesive therein;

forcing the adhesive-coated side of the application sheet and the fabric together under sufficient heat and pressure for a sufficient period to adhere the light diffracting laminate of clear coating and reflective agent layers of the application sheet to the fabric, the heat and pressure being sufficient to at least partially cure the adhesive to stabilize the fabric fibers at the location of the adhesive so as to substantially eliminate shifting of said fabric fibers relative to one another in the region of the applied image to prevent deterioration of the light diffracting image associated with fiber shifting, which occurs during laundering of the product; and pulling the light diffracting application sheet away from the fabric to pull the clear coating and reflective agent layers of the application sheet therewith, away from the fabric, except at the locations having said curable material, at which the clear coating and reflective agent layers will not be separated from the fabric, instead remaining adhered to the fabric in the pattern of the applied curable material.

9. A launderable material having light diffracting characteristics, comprising:

a fabric having a penetrable upper surface;

a layer of adhesive bonded to said upper surface of the fabric in a predetermined pattern, with a portion of the adhesive penetrated into said fabric, said adhesive layer defining an upper adhesive layer surface;

a layer of catalyst hardening material bonded to said upper adhesive layer surface in said predetermined pattern, said catalyst hardening material layer defining an upper catalyst hardening material surface;

a layer of adherent bonded to said upper catalyst hardening material surface in said predetermined pattern, said adherent layer defining an upper adherent layer surface; and a light diffracting laminate, comprising clear coating and reflective agent layers, bonded to said upper adherent layer surface in said predetermined pattern.

10. A launderable material in accordance with claim 9 wherein said catalyst hardening material is only partially cured.

11. A launderable material in accordance with claim 9 wherein said catalyst hardening material layer is fully cured.

12. A launderable material in accordance with claim 9 wherein said adhesive layer and catalyst hardening material layer substantially prevent deterioration of the applied light diffracting image associated with shifting of the fabric threads.

13. A light-diffracting iron-on sheet for forming a predetermined, launderable light diffracting image on a fabric having fibers, the iron-on sheet comprising:

a release liner;

a laminate of clear coating and reflective agent layers having light diffracting characteristics bonded to said release liner in a predetermined pattern, with a predetermined bonding strength; and a layer of heat activated stabilizing material bonded to said laminate in said predetermined pattern, with a bonding strength greater than said predetermined bonding strength;

said stabilizing material being bondable to the fabric threads with a bonding strength greater than said predetermined bonding strength when forced against the fabric under sufficient heat and pressure, to bond the laminate and release liner to the fabric therewith;

the greater bonding strengths of the bonds between the stabilizing material and the laminate, and between the stabilizing material and fabric, relative to the bonding strength between the laminate and the release liner, allowing for peeling away of the release liner following bonding of the layer of stabilizing material to the fabric; and said stabilizing material having fiber stabilizing characteristics suitable for stabilizing the fabric threads in the regions over which the stabilizing material is bonded to the fabric, to stabilize the portion of the fabric beneath the predetermined pattern of light diffracting laminate.

14. A light diffracting iron-on sheet in accordance with claim 13 wherein the stabilizing material is bondable to the fabric by placing the stabilizing material side of the iron-on sheet against the fabric and applying heat and pressure to the release liner side of the iron-on sheet.

15. A light diffracting iron-on sheet in accordance with claim 14 wherein the heat and pressure required to bond the stabilizing material to the fabric are attainable by manual operation of a conventional iron.

16. A light diffracting iron-on sheet for forming a selective, launderable image on a fabric having threads, the iron-on sheet comprising:

a release liner;

a laminate of clear coating and reflective agent layers having light diffracting characteristics bonded to said release liner with a predetermined bonding strength;

a layer of heat activated stabilizing material bonded to said laminate by a bonding strength greater than said predetermined bonding strength, said layer of stabilizing material being bondable to the fabric in a selective pattern defined by the selective portions acted upon by sufficient heat and pressure with a bonding strength greater than said predetermined bonding strength, whereby the light diffracting laminate and the stabilizing material bond to the fabric over those portions acted upon by said heat and pressure, and whereby upon subsequent peeling of the release liner away from the fabric those portions of the iron-on sheet which were not acted upon by said heat and pressure will remain adhered to the release liner as it is peeled away from the fabric, with the laminate and stabilizing material remaining bonded to the fabric in a pattern corresponding to the selective pattern.

17. A light diffracting iron-on sheet in accordance with claim 16 wherein said sufficient heat and pressure to adhere the portions of the stabilizing material is attained by pressing a heated instrument against the release liner side of the iron-on sheet while the stabilizing material side of the iron-on sheet is placed against the fabric.

18. A composite material having light diffracting characteristics, formed from a sheet of light diffracting laminate having a predetermined overall light diffracting image extending thereacross, the material comprising:

a substrate;

a plurality of discrete pieces of light diffracting laminate taken from said sheet of light diffracting laminate;

said plurality of discrete pieces of light diffracting laminate being adhered to the substrate in a spacing and orientation with respect to one another on the substrate which is substantially identical to the spacing and orientation which the pieces of light diffracting laminate occupied on the light diffracting laminate sheet prior to their being taken from the light diffracting laminate sheet;

each of said plurality of discrete pieces of light diffracting laminate having a respective light diffracting image thereon;

said respective light diffracting images of each of said discrete pieces of light diffracting laminate being complementary to the light diffracting images of the other discrete pieces of light diffracting laminate adhered to the substrate; and the aggregate of the respective light diffracting images of the plurality of discrete pieces of light diffracting laminate adhered to the substrate substantially recreating at least a portion of said overall light diffracting image of the light diffracting laminate sheet on said substrate.

* * * * *

UNITED STATES PATENT AND TRADEMARK OFFICE
CERTIFICATE OF CORRECTION

PATENT NO. : 5,407,729
DATED : April 18, 1995
INVENTOR(S) : Roger E. Verden et al.

It is certified that error appears in the above-indentified patent and that said Letters Patent is hereby corrected as shown below:

Title Page, [73] Assignee, change "Prismatic, Inc." to --Prismagic, Inc.--.

Signed and Sealed this

Fourth Day of July, 1995

BRUCE LEHMAN

Attest:

Attesting Officer     Commissioner of Patents and Trademarks